Oct. 1, 1929.　　　W. F. MacGREGOR　　　1,730,225
COMBINATION HARVESTER THRASHER
Filed March 21, 1925　　　2 Sheets-Sheet 1
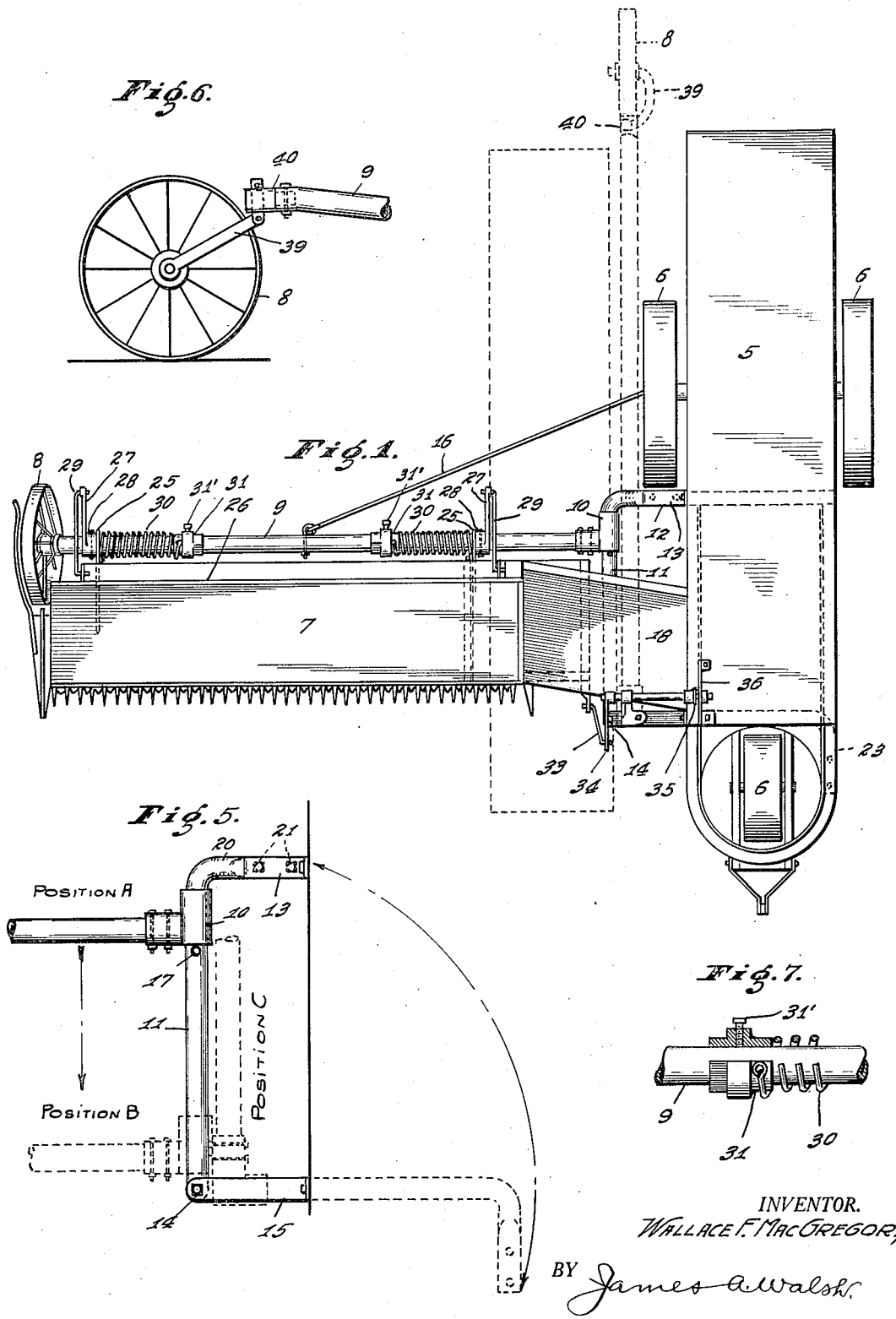
INVENTOR.
WALLACE F. MacGREGOR,
BY James A. Walsh
ATTORNEY.

Oct. 1, 1929.  W. F. MacGREGOR  1,730,225
COMBINATION HARVESTER THRASHER
Filed March 21, 1925   2 Sheets-Sheet 2
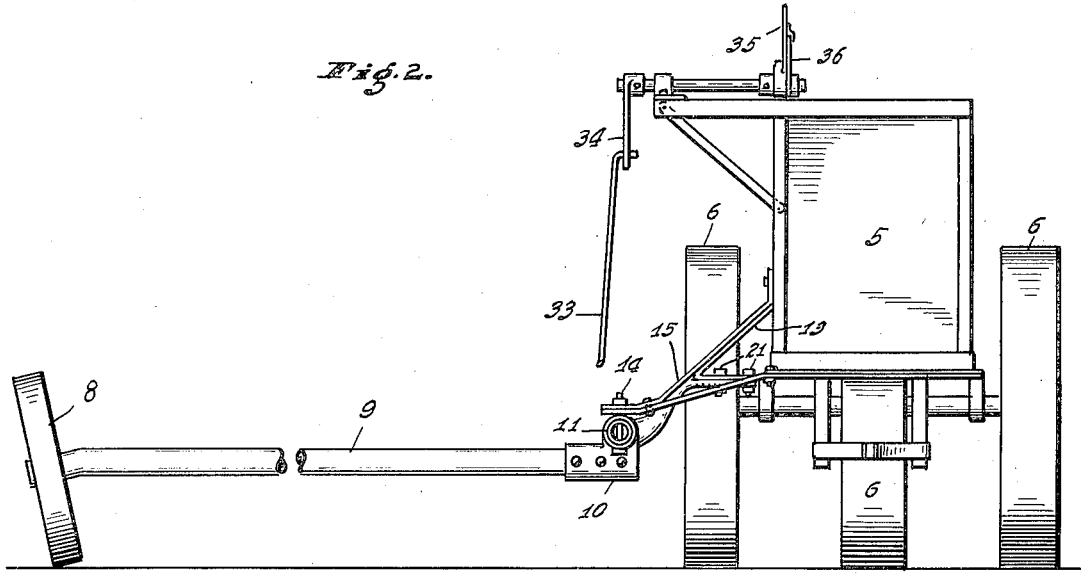
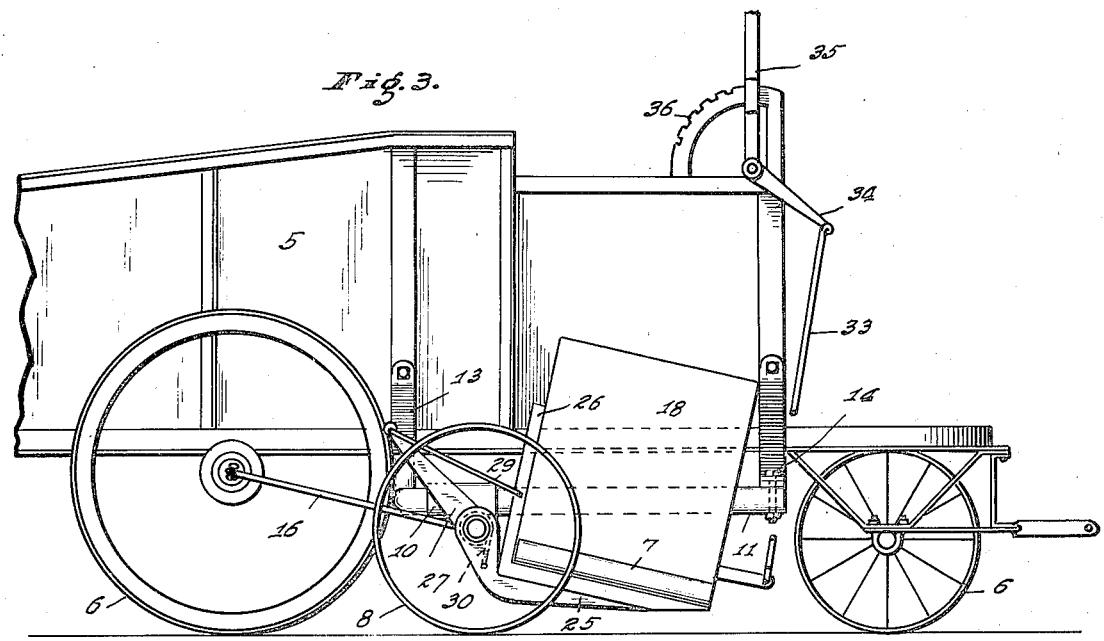
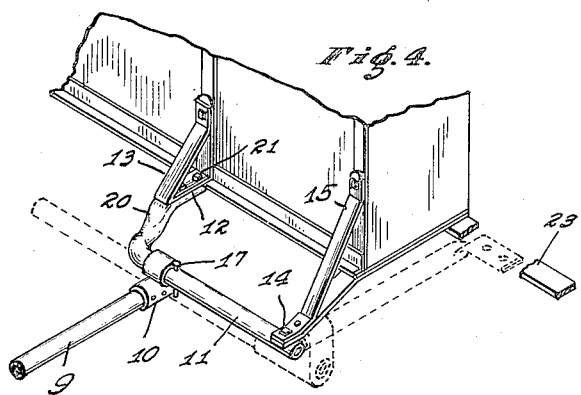
INVENTOR.
WALLACE F. MacGREGOR,
BY James A. Walsh
ATTORNEY.

Patented Oct. 1, 1929

1,730,225

UNITED STATES PATENT OFFICE

WALLACE F. MacGREGOR, OF RACINE, WISCONSIN, ASSIGNOR TO J. I. CASE COMPANY, OF RACINE, WISCONSIN, A CORPORATION

COMBINATION HARVESTER-THRASHER

Application filed March 21, 1925. Serial No. 17,382.

The object of my invention is to provide means for flexibly connecting the harvester and thrasher of a combination machine of such character to permit vertical adjustment between such two elements and whereby the harvester may be readily swung alongside the thrasher and closely adjacent thereto so that said elements may occupy the minimum of space in width and thus be enabled to move through gates and other limited passageways; and it is my further object to improve such machine in other respects so that the harvester may be readily controlled while operating in the field, as will appear from the following description.

In the accompanying drawings, forming part hereof, Figure 1 is a plan of a combination harvester-thrasher embodying my improvements; Fig. 2 a front elevation thereof with parts of the harvester omitted for clearness; Fig. 3 a side elevation of the machine; Fig. 4 a perspective of the hinge arrangement which I employ; Fig. 5 a diagrammatic view showing the range of adjustment of which my improved hinge is capable; Fig. 6 an elevation of the harvester ground-wheel as it appears when converted into a caster wheel; and Fig. 7 a detail of spring tensioning devices which I employ.

In said drawings the thrasher, indicated at 5, is mounted upon the usual carrying wheels, 6, and the harvester, 7, is provided with a ground-wheel, 8. In order to provide for vertical vibration of the machine elements I secure to axle, 9, of the harvester or other appropriate part thereof, a hinge member, 10, and mount the same upon a pintle, 11, which may be a tubular member detachably secured, at 12, to a bracket, 13, or other portion of the thrasher, its opposite end being pivotally connected, as at 14, to a bracket, 15, or otherwise. In the position indicated in full lines, it will be observed that said hinge member 10 will rock on said pintle 11, and therefore the harvester 7 connected thereto will readily move vertically when traveling over ground irregularities during field operations. When it is desired to transport the machine as a whole in compact form the harvester 7 may be folded closely alongside the thrasher 5 in the following manner: The brace-rod, 16, and other similar connections are removed, as well as pin 17 from the pintle 11, and carrier, 18, folded upon or supported on the harvester or removed, when the latter with hinge member 10 are moved forwardly from position A indicated in Fig. 5 to position B. The arm, 20, of pintle 11 is then detached from the thrasher by removing the connecting bolts, 21, when said pintle 11 through its pivotal connection 14 may be readily swung around under the thrasher as the harvester is brought around in a horizontal direction to occupy the position indicated by dotted lines in Fig. 1, said pintle 11 then assuming the position C indicated in said Fig. 5. When so positioned the pintle 11 has turned on its pivot around to the position indicated by dotted lines in Fig. 5 and its arm 20 secured to bracket, 23, or other portion of the thrasher, by the bolts 21, so that the thrasher, indicated in full lines in Fig. 1 and the harvester in dotted lines, are securely held in parallel relation and compactly folded for transportation or storage.

As will be understood, when adjusting the machine in the field or otherwise, the harvester may be swung around to the position shown in full lines in Fig. 1 by removing bolts 21, when pintle 11 will be returned to the position indicated in full lines in Fig. 5 as the harvester is brought around to working position, when said bolts are again utilized to secure the pintle, at 13, in position for field operation of the harvester, the range of movement of said pintle as the harvester is being folded with and adjusted from the thrasher being indicated by the curved dotted line in Fig. 5.

The harvester 7 is mounted upon the axle 9 through the arms, 25, which support the harvester frame, 26, and mechanisms associated therewith. Levers, 27, are also mounted upon said axle 9, by the collars, 28, and each of said levers is connected to the frame 26 by links, 29. The arms 25 are yieldingly secured to axle 9 by the coiled springs, 30, secured at one end to said arms, and at their opposite ends are anchored to a collar, 31, on said axle, by which arrangement the weight of the harvester and its connections are balanced throughout the range of its normal working conditions. Said collars 31 are secured to axle 9 by set screws, 31', so that the tension of springs 30 may be regulated by turning the collars with a suitable tool. To adjust the harvester to variable heights of cut, I provide a controlling device, preferably of a toggle character, comprising links, 33, 34, connected to a lever, 35, adapted to engage with a segment, 36, in a manner well known. By this simple arrangement an attendant may readily control the vertical movement of the harvester so that the same may at all times be easily adjusted to varying heights of grain to properly cut and transfer the crop to the thrasher.

To further enable an attendant to adjust the harvester in folding and traveling conditions the ground-wheel 8 is provided, as shown in Fig. 1, so that the same will support the harvester while being swung in parallel relation to the thrasher. When this has been accomplished said wheel 8 may be converted into a caster-wheel by attaching thereto an arm, 39, inserted in a suitable bearing, 40, in axle 9, as indicated in Fig. 6, in which position, as will be understood, wheel 8 will be in line with the thrasher wheels 6 and in proper traveling relation thereto.

I claim as my invention:

1. In a machine of the class described, a thrasher, a harvester, a pintle detachably secured at one end to said thrasher and pivotally secured thereto at its opposite end to swing horizontally in relation to the thrasher, and a hinge member on said harvester connected to said pintle whereby the harvester may oscillate vertically and also be moved to position to be folded alongside said thrasher.

2. In a machine of the class described, a harvester, a thrasher, a pintle on said thrasher, means connecting said harvester to said pintle whereby the harvester may be moved forwardly and rearwardly in relation to said pintle, and means for detaching said pintle at one end to permit said harvester to be swung in a horizontal direction and alongside said thrasher.

3. In a machine of the class described, a harvester, a thrasher, an axle connecting said harvester and thrasher, means connecting said axle and harvester, a torsional spring associated with said connecting means and surrounding and secured to said axle for balancing the weight of said harvester, and mechanism connecting said harvester and thrasher for manually controlling the vertical movements of said harvester.

4. In a machine of the class described, a harvester, a thrasher, an axle, arms on said axle for supporting said harvester, means for connecting said axle to said thrasher, springs mounted upon and surrounding said axle and connected to said arms for counterbalancing the weight of the harvester, and mechanism on said thrasher and connected to said harvester for vertically adjusting the latter.

5. In a machine of the class described, a thrasher, a harvester, an axle supporting the harvester, means for flexibly connecting the axle to the thrasher, means for vertically adjusting the harvester to the varying heights of grain to be cut, and a torsional spring mounted upon and surrounding the axle and connected to the harvester for counterbalancing the weight of the latter during its vertical adjustments.

6. In a machine of the class described, a thrasher, a supporting member extending laterally therefrom, a harvester, means for connecting said harvester to said supporting member, a spring engaging said supporting member and engaging said connecting means to counterbalance the weight of said harvester, and means connected to said spring for regulating the tension thereof.

7. In a machine of the class described, a thrasher, a harvester, a pintle pivotally connected at one end to the thrasher, a hinge member on the harvester pivotally connected to the pintle so that the harvester may oscillate vertically and also be moved forwardly and rearwardly along said pintle, and detachable means connecting the opposite end of the pintle to the thrasher so that when disconnected said pintle may be swung horizontally on its pivotal connection with the thrasher and the harvester folded alongside of and in parallel relation to the thrasher.

8. In a machine of the class described, a harvester, a thrasher, a pintle connected at one end to the thrasher and pivotally connected thereto at its opposite end, a hinge member connected to the pintle and the harvester whereby the latter may oscillate vertically and be moved forwardly in relation to the thrasher, and means for detaching the pintle to permit the swinging movement thereof about its pivotal connection with the thrasher when folding the harvester alongside the thrasher.

9. In a machine of the class described, a harvester, a thrasher, a pintle pivotally connected to and adjustable in parallel and transverse relations to the thrasher, means for securing the pintle to the thrasher when adjusted in said positions, and a hinge member pivotally and slidably mounted on the pintle and connected to the harvester whereby the harvester may oscillate vertically and also be moved along said pintle.

10. In a machine of the class described, a thrasher, a harvester, a pintle pivotally connected to the thrasher and normally positioned in parallel relation thereto, a hinge flexibly connecting the harvester to the pintle whereby the harvester may oscillate vertically during field operations and transportation and be moved along the pintle to position the harvester in readiness for folding alongside the thrasher, and means for detaching the pintle at the end thereof opposite to its pivotal connection whereby said pintle, hinge and harvester may be swung horizontally and the harvester folded in parallel relation to the thrasher.

In testimony whereof I affix my signature.

WALLACE F. MacGREGOR.